(12) United States Patent
Tanaka et al.

(10) Patent No.: US 12,055,786 B2
(45) Date of Patent: Aug. 6, 2024

(54) LENS GROUP ASSEMBLY, OPTICAL LENS, CAMERA MODULE AND LENS GROUP ASSEMBLING METHOD

(71) Applicant: Ningbo Sunny Opotech Co., Ltd., Zhejiang (CN)

(72) Inventors: Takehiko Tanaka, Zhejiang (CN); Heng Jiang, Zhejiang (CN); Lin Liu, Zhejiang (CN); Liefeng Chen, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 801 days.

(21) Appl. No.: 17/268,191

(22) PCT Filed: Jul. 10, 2019

(86) PCT No.: PCT/CN2019/095390
§ 371 (c)(1),
(2) Date: Feb. 12, 2021

(87) PCT Pub. No.: WO2020/034790
PCT Pub. Date: Feb. 20, 2020

(65) Prior Publication Data
US 2021/0318512 A1    Oct. 14, 2021

(30) Foreign Application Priority Data

Aug. 14, 2018 (CN) .......................... 201810922696.1
Aug. 14, 2018 (CN) .......................... 201821305574.X (51) Int. Cl.
*G02B 7/02* (2021.01)
*G03B 17/12* (2021.01)
*H04N 23/55* (2023.01)

(52) U.S. Cl.
CPC ............. *G02B 7/025* (2013.01); *G02B 7/021* (2013.01); *G03B 17/12* (2013.01); *H04N 23/55* (2023.01)

(58) Field of Classification Search
CPC ......... G02B 7/025; G02B 7/021; G03B 17/12
See application file for complete search history.

(56) References Cited

U.S. PATENT DOCUMENTS

| 5,570,237 A | 10/1996 | Sato |
| 10,871,624 B2 | 12/2020 | Nagao |

(Continued)

FOREIGN PATENT DOCUMENTS

| CN | 205594217 | 9/2016 |
| CN | 207249220 | 4/2018 |

(Continued)

OTHER PUBLICATIONS

Extended European Search Report issued Aug. 17, 2021 in corresponding European Patent Application No. 19849325.6.

(Continued)

*Primary Examiner* — Wen Huang
(74) *Attorney, Agent, or Firm* — Wenderoth, Lind & Ponack, L.L.P.

(57) ABSTRACT

A lens group assembly includes a lens barrel and a plurality of lenses. The lenses are embedded in the lens barrel to assemble the lens group, and there is an adhesive material between at least two of the lenses and/or between at least one of the lenses and the lens barrel to reinforce the structural strength of the assembled lens group. A corresponding optical lens, a camera module and a lens group assembling method are also included. Assembling accuracy and assembling stability of the high-sensitivity multi-lens optical system is improved by increasing the adhesion between the lenses. Variation of the optical lens is reduced based on an (Continued)

active calibration process. Adhesive material that might otherwise overflow is accommodated. Defects caused by the assembly of the optical lens are reduced based on the active calibration process, especially the field curvature and peak variation.

19 Claims, 6 Drawing Sheets

(56) References Cited

U.S. PATENT DOCUMENTS

| | | |
|---|---|---|
| 2008/0252771 A1 | 10/2008 | Wu |
| 2011/0069198 A1 | 3/2011 | Ezawa et al. |
| 2016/0154201 A1 | 6/2016 | Furutake et al. |
| 2018/0188472 A1 | 7/2018 | Deng et al. |
| 2019/0310438 A1 | 10/2019 | Komiyama |

FOREIGN PATENT DOCUMENTS

| | | |
|---|---|---|
| CN | 108375819 | 8/2018 |
| JP | 2010-191345 | 9/2010 |
| JP | 2010-281992 | 12/2010 |
| JP | 2018-072766 | 5/2018 |
| JP | 2018-097294 | 6/2018 |
| KR | 10-2018-0087272 | 8/2018 |
| WO | 2010/116687 | 10/2010 |
| WO | 2018/105577 | 6/2018 |

OTHER PUBLICATIONS

Office Action issued Oct. 24, 2023 in corresponding European Patent Application No. 19849325.6.
International Search Report issued Aug. 27, 2019 in International (PCT) Application No. PCT/CN2019/095390 with English translation.

LENS GROUP ASSEMBLY, OPTICAL LENS, CAMERA MODULE AND LENS GROUP ASSEMBLING METHOD

CROSS REFERENCES TO RELATED APPLICATIONS

This application claims the priority and benefits of the Chinese invention patent application filed in the China National Intellectual Property Office (CNIPA) on Aug. 14, 2018, with application number 201810922696.1, and the title of the invention "lens group assembly, optical lens, camera module and lens group assembling method", and the Chinese utility model patent application filed in CNIPA on Aug. 14, 2018, with the application number 201821305574.X, and the title of the invention "lens group assembly, optical lens and camera module", these two applications are incorporated herein by reference in their entirety.

FIELD OF THE INVENTION

The present application relates to the technical field of optical imaging. Specifically, the present application relates to a lens group assembly, an optical lens, a camera module, and a lens group assembling method.

BACKGROUND OF THE INVENTION

With the development of mobile phones, computers and other terminals, users have greatly improved their needs. Especially with the development of mobile phones, users' pursuit of shooting quality has led manufacturers to develop personalized and customized camera modules, such as a lens with a large aperture, a large wide-angle, and a lens with a large number of lenses that solve aberrations. On one hand, this is more and more complicated in optical design, on the other hand, the reality is that the complex optical system is very sensitive, which poses large challenge to the manufacturing yield and product quality. Because the optical system of a camera module with a large aperture and a large wide-angle is more sensitive, the reliability of its manufacturing process and verification process will be more fragile than conventional designs. Therefore, a lens with a better structure is now needed. Further, in order to meet more and more extensive market demands, high pixels, small size, and large aperture are the irreversible development trends of existing camera modules. However, it is very difficult to achieve the three requirements of high pixels, small size, and large aperture in a same camera module. For example, the compact development of mobile phones and the increase in the proportion of mobile phone screens have made the space available for front camera modules in mobile phones smaller and smaller, and the market has proposed higher and higher demands for the imaging quality of camera modules.

In the field of compact camera modules (such as those used in mobile phones), it is often necessary to consider the quality of an optical imaging lens and manufacturing errors in the module packaging process. Specifically, in the manufacturing process of the optical imaging lens, the factors affecting the resolution of the lens come from the errors of each element and its assembly, the error of the thickness of the lens spacing element, the error of the assembly fit of each lens, and the change of the refractive index of the lens material. Because there are many factors that affect the resolution of the lens, which exist in multiple elements, the control of each factor has the limit of manufacturing accuracy. If you just simply improve the accuracy of each element, the improving capacity is limited, the upgrade cost is high, and it cannot meet the increasing demand for improved imaging quality in the market.

The applicant proposes an assembly method of adjusting and determining a relative position of upper and lower sub-lens based on an active calibration process, and then adhering the upper and lower sub-lens together according to the determined relative position, thereby manufacturing a complete optical lens or camera module. This solution can improve the Process Capability Index (CPK) of mass-produced optical lenses or camera modules; it can loosen the requirements for the accuracy of each element of the material (such as the sub-lens or photosensitive assemblies used to assemble optical lenses or camera modules) and its assembly accuracy, thereby reducing the overall cost of the optical imaging lens and camera module; adjusting various aberrations of the camera module in real time during the assembly process, reducing the defect rate, reducing production costs, and improving imaging quality.

However, actively calibrating the optical system of the lens itself is a new production process. Actual mass production needs to consider many factors such as the reliability, drop resistance, weather resistance and production cost of the optical lens and camera module, and sometimes it is necessary to face a decrease in yield caused by various unpredictable factors. The applicant believes that improving the structural reliability of optical lenses manufactured based on the active calibration process is an important direction for thinking about improving the imaging quality and yield of such optical lenses. Therefore, there is an urgent need for a solution that can improve the structural reliability of the optical lens manufactured based on the active calibration process.

SUMMARY OF THE INVENTION

This application aims to provide a solution that can overcome at least one defect of the prior art.

According to one aspect of the present application, there is provided a lens group assembly, including: a lens barrel; and a plurality of lenses, the plurality of lenses are embedded in the lens barrel to assemble a lens group, and there is an adhesive material between at least two lenses of the plurality of lenses and/or between at least one lens of the plurality of lenses and the lens barrels to reinforce a structural strength of the assembled lens group.

Wherein, the plurality of lenses has three lenses at a front end, and the adhesive material is arranged between at least two lenses of the three lenses at the front end and/or between at least one lens of the three lenses at the front end and the lens barrels.

Wherein, the lens has an optical zone and a structural zone surrounding the optical zone, and the plurality of lenses includes two adjacent adhesive reinforcement lenses, and there is the adhesive material between the structural zones of the two adjacent adhesive reinforcement lenses.

Wherein, the lens has an optical zone and a structural zone surrounding the optical zone, and the plurality of lenses include adjacent first fitting lenses and second fitting lens, the structure zone of the first fitting lens has a first fitting protrusion, the structure zone of the second fitting lens has a second fitting protrusion, and the first fitting protrusion and the second fitting protrusion are staggered with each other, and the adhesive material is arranged in a fitting gap formed between an inner surface of the first fitting protrusion and an outer surface of the second fitting protrusion.

Wherein, the adhesive material includes glue and/or glue film.

Wherein, when the adhesive material is glue, the glue is glue with a thixotropic coefficient within 1.2 and a viscosity below 500.

Wherein, when the adhesive material is glue, the plurality of lenses include two adjacent adhesive reinforcement lenses, and a spacer ring is arranged between the two adjacent adhesive reinforcement lenses, the spacer ring has a notch and the notch contains the glue.

Wherein, when the adhesive material is glue film, the plurality of lenses include two adjacent adhesive reinforcement lenses, and the two adjacent adhesive reinforcement lenses are adhesived by the glue film.

Wherein, the plurality of lenses include an embedded reinforced lens, and the adhesive material is provided between the embedded reinforced lens and the lens barrel.

Wherein, an inner side of the lens barrel has multi-level steps, and the plurality of lenses are sequentially embedded in the multi-level steps.

Wherein, each step in the multi-level steps includes a step side wall and a step surface, wherein the step side wall is parallel to the axis of the lens barrel, and the step surface is perpendicular to the axis of the lens barrel.

Wherein, the adhesive material is glue, the inner side of the lens barrel has a flow guide channel, and the flow guide channel communicates with at least two adjacent steps of the multi-level steps, so as to be suitable for the flow of glue between the at least two adjacent steps, and the flow guide channel is filled with the glue.

Wherein, the flow guide channel is a flow guide groove, and the embedded reinforcement lens is provided at at least one step corresponding to the flow guide groove, and a gap between an outer surface of the embedded reinforcement lens and the flow guide groove is filled with the adhesive material.

Wherein, the adhesive material is arranged in a ring shape, or the adhesive material is distributed at a plurality of points in the ring shape.

Wherein, the adhesive material is an UV glue, an UV thermosetting glue, a thermosetting glue, a moisture curing glue, an anaerobic glue or a solvent evaporative curing glue.

According to another aspect of the present application, there also provides an optical lens, including: a first lens component, including at least one first lens; a second lens component, including a second lens barrel and at least one second lens mounted in the second lens barrel, and the at least one second lens and the at least one first lens constitute an imageable optical system together; and an active calibration adhesive glue, which is located between the first lens component and the second lens component, and is adapted to support the first lens component and the second lens component so that a relative position of the two is maintained at a relative position determined by active calibration; wherein the second lens component is the lens group assembly described above, and the second lens barrel is the lens barrel of the lens group assembly, and the at least one second lens is the plurality of lenses of the lens group assembly.

Wherein, the first lens component further includes a first lens barrel, and the at least one first lens is mounted in the first lens barrel.

Wherein, the first lens component is the lens group assembly, and the first lens barrel is the lens barrel of the lens group assembly, and the at least one first lens is the plurality of lenses of the lens group assembly.

Wherein, the first lens component is located at the front end of the optical lens.

Wherein, a non-zero included angle is between the axis of the first lens component and the axis of the second lens component.

According to another aspect of the present application, a camera module is also provided, which includes the lens group assembly described above.

According to another aspect of the present application, another camera module is provided, which includes the aforementioned optical lens.

According to another aspect of the present application, there also provides a lens group assembling method, including: 1) sequentially embedding a plurality of lenses into a lens barrel with multi-level steps at an inner side thereof to assemble a lens group; and 2) during the execution of step 1) or after completion of step 1), adding the adhesive material between at least two lenses of the plurality of lenses and/or between at least one lens of the plurality of lenses and the lens barrel to reinforce an structural strength of the assembled lens group.

Wherein, the step 2) includes the sub-steps: a) for two adjacent lenses of the plurality of lenses, after the former lens is embedded, arranging an adhesive material on a surface of a structure zone of the former lens, and then embedding the latter lens.

Wherein, the step 2) includes sub-steps: b) for two adjacent lenses of the plurality of lenses, after the former lens is embedded, arranging glue between the former lens and the lens barrel, and then embedding the latter lens.

Wherein, the step 2) includes the sub-steps: c) the adhesive material being glue, and after the adjacent lenses of the plurality of lenses are embedded in the lens barrel, arranging glue through a flow guide channel provided at the inner side of the lens barrel, so that the glue enters a gap between the structural zones of the adjacent lenses along the flow guide channel.

Wherein, in the step a), the adhesive material is glue, and the step a) further includes: after the former lens is embedded, arranging a spacer ring on the surface of the structure zone of the former lens, and the spacer ring having a concave, wherein the concave is recessed from outside to inside along a direction perpendicular to the optical axis, and the area of the surface of the former lens corresponding to the position of the concave is exposed; then arranging the glue on the area of the former lens corresponding to the position of the concave; and finally embedding the latter lens. Wherein, in the step a), the adhesive material is glue film, and the glue film forms a diaphragm. Compared with the prior art, the present application has at least one of the following technical effects:

1. The present application can improve the assembling accuracy and assembling stability of a high-sensitivity multi-lens optical system by increasing the adhesion between the lenses (for example, using glue/glue film reinforcement).

2. The present application can increase the connection strength of the lens group to reduce the variation of the optical lens based on the active calibration process.

3. The present invention can accommodate the adhesive material that might otherwise overflow through structural design such as the reserved gap on the side wall of the lens dark object (such as the lens barrel) and the spacer ring gap, and enhance the connection strength between the lens and the dark object, and between the lens and the lens at the same time.

The present application can increase the adhering strength of the lower lens group to reduce the defects caused by the assembly of the optical lens based on the active calibration process, and especially reduce the field curvature and peak variation.

BRIEF DESCRIPTION OF THE DRAWINGS

Exemplary examples are shown in the referenced drawings. The examples and drawings disclosed herein should be regarded as illustrative rather than restrictive.

DETAIL DESCRIPTION OF THE INVENTION

In order to better understand the present application, various aspects of the application will be described in more detail with reference to the drawings. It should be understood that these detailed descriptions are only descriptions of exemplary embodiments of the present application, and are not intended to limit the scope of the present application in any way. Throughout the specification, the same reference numerals refer to the same elements. The expression "and/or" includes any and all combinations of one or more of the associated listed items.

It should be noted that in this specification, expressions such as first, second, etc. are only used to distinguish one feature from another feature, and do not represent any restriction on the feature. Therefore, without departing from the teaching of the present application, the first subject discussed below may also be referred to as the second subject.

In the drawings, the thickness, size, and shape of objects have been slightly exaggerated for ease of description. The drawings are only examples and are not drawn strictly to scale.

It should also be understood that the terms "include", "include with", "having", "including" and/or "including with" when used in this specification mean that the stated features, wholes, steps, operations elements and/or components exist, but does not exclude the presence or addition of one or more other features, wholes, steps, operations, elements, components, and/or combinations thereof. In addition, when expressions such as "at least one of . . . " appear after the list of listed features, the entire listed feature is modified instead of individual elements in the list. In addition, at the time of describing the embodiments of the present application, the use of "may" means "one or more embodiments of the present application". Also, the term "exemplary" is intended to refer to an example or illustration.

As used herein, the terms "substantially," "approximately," and similar terms are used as approximate terms, not as terms representing degree, and it is also intended to illustrate the inherent deviations in the measured or calculated values that will be recognized by those of ordinary skill in the art.

Unless otherwise defined, all terms (including technical terms and scientific terms) used herein have the same meanings as commonly understood by those of ordinary skill in the art to which this application belongs. It should also be understood that terms (such as those defined in commonly used dictionaries) should be interpreted as having meanings consistent with their meanings in the context of related technologies, and will not be interpreted in an idealized or excessively formal sense, unless this is clearly defined in this article.

It should be noted that the embodiments in the application and the features in the embodiments can be combined with each other if there is no conflict. Hereinafter, the present application will be described in detail with reference to the drawings and in conjunction with embodiments.

Figure 1:
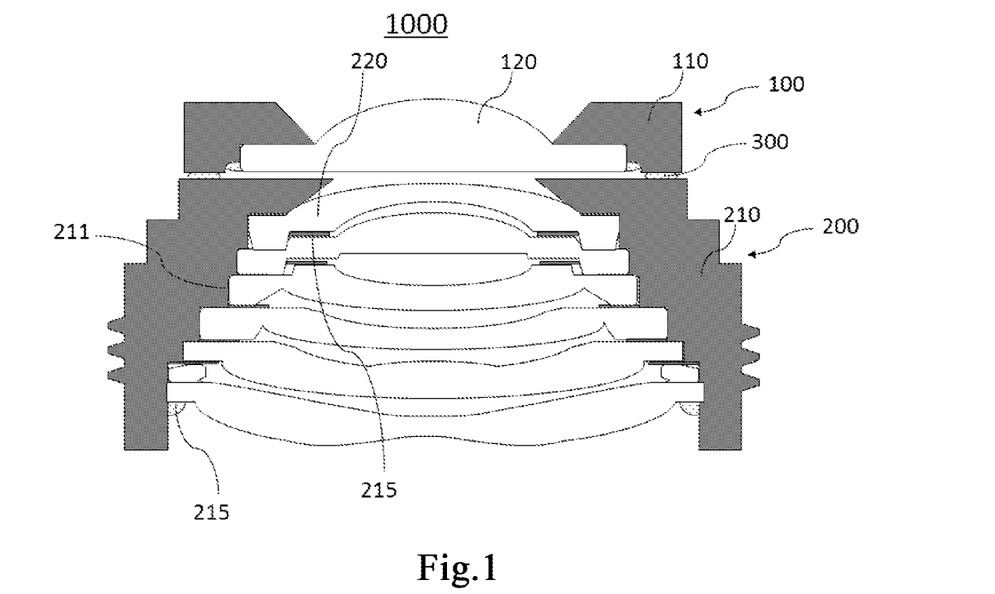
FIG. 1 shows a schematic cross-sectional view of an optical lens 1000 according to an embodiment of the present application.

FIG. 1 shows a schematic cross-sectional view of an optical lens 1000 according to an embodiment of the present application. As shown in FIG. 1, the optical lens 1000 of this embodiment includes a first lens component 100, a second lens component 200 and an adhesive 300 for bonding the first component 100 and second lens components 200. The adhesive 300 is suitable for supporting the first and second lens components after being cured and keeping a relative position between the two at a relative position determined by an active calibration. Therefore, the adhesive 300 can be called an active calibration adhesive, in order to distinguish from other plastic materials. The other adhesive material mentioned here may be, for example, an adhesive material 215 used to reinforce the structure of the lens group which will be mentioned below. Herein, the active calibration is a manufacturing process of calibrating the relative positions of the first lens component 100 and the second lens component 200 with multiple degrees of freedom based on an imaging result of a photosensitive chip. The specific method of the active calibration will be further detailed below, the description will not be expanded here. In this embodiment, the first lens component 100 includes a first lens barrel 110 and a first lens 120 mounted in the first lens barrel 110 (the number of the first lens 120 in this embodiment is one, but it should be noted that the present application is not limited to this, and there can also be multiple first lenses 120). The second lens component 200 includes a second lens barrel 210 and a plurality of second lenses 220 mounted in the second lens barrel 210. The first lens 120 and the plurality of second lenses 220 together constitute an imageable optical system. In this embodiment, the second lens component 200 is a lens group assembly that increases the strength of the connection between the lenses. Specifically, in this embodiment, a plurality of second lenses 220 are embedded in the second lens barrel 210 to assemble a lens group, and there is an adhesive material 215 between the two adjacent second lenses 220 at the bottom to reinforce the structural strength of the assembled lens group. It should be noted that what is shown in FIG. 1 is only one way to reinforce the structural strength of the lens group. In other embodiments of the present application, an adhesive material may be provided between at least two lenses of the plurality of second lenses 220 in other ways to reinforce the structural strength of the assembled lens group; it is also possible to provide the adhesive material 215 between at least one lens of the plurality of second lenses 220 and the lens barrel to reinforce the structural strength of the assembled lens group; it is also possible to provide the adhesive material 215 between at least two lenses of the plurality of second lenses 220, and between at least one lens of the plurality of lenses and the lens barrel to reinforce the structural strength of the assembled lens group. For the plurality of lenses, they are embedded into a same lens barrel to assemble a lens group, and the adhesive material 215 is used to increase the connection strength between the lenses during lens assembling, which can improve the assembling accuracy and assembling stability of the high-sensitivity optical system. In one embodiment, the first lens component 100 is located at the front end of the optical lens 1000, that is, at an end close to the object, and the second lens component 200 is located at the rear end of the optical lens 1000.

Further, still referring to FIG. 1, in an embodiment of the present application, the lens has an optical zone and a structural zone surrounding the optical zone. Wherein, the lens includes the first lens 120 or the second lens 220. In the lens group assembly, the plurality of lenses includes two adjacent adhesive reinforcement lenses, and the adhesive material 215 is provided between the structural zones of the two adjacent adhesive reinforcement lenses.

Figure 2:
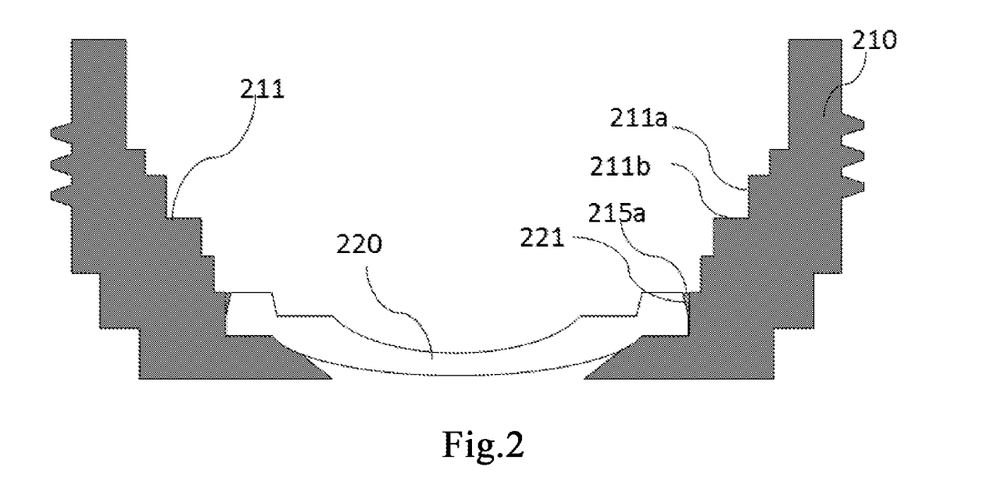
FIG. 2 shows a schematic diagram of embedding the first lens into a lens barrel in an embodiment of the present application.

Further, in an embodiment of the present application, an inner side of the second lens barrel 210 may have multi-level steps 211. FIG. 2 shows a schematic diagram of embedding the first lens into the lens barrel in an embodiment of the present application. Referring to FIG. 2, the inner side of the lens barrel (for example, the second lens barrel 210) has multi-level steps 211, and the plurality of lenses are sequentially embedded in the multi-level steps 211. Each of the multi-level steps 211 includes a step side wall 211*a* and a step surface 211*b*, wherein the step side wall 211*a* is parallel to the axis of the lens barrel, and the step surface 211*b* is perpendicular to the axis of the lens barrel.

Figure 3:
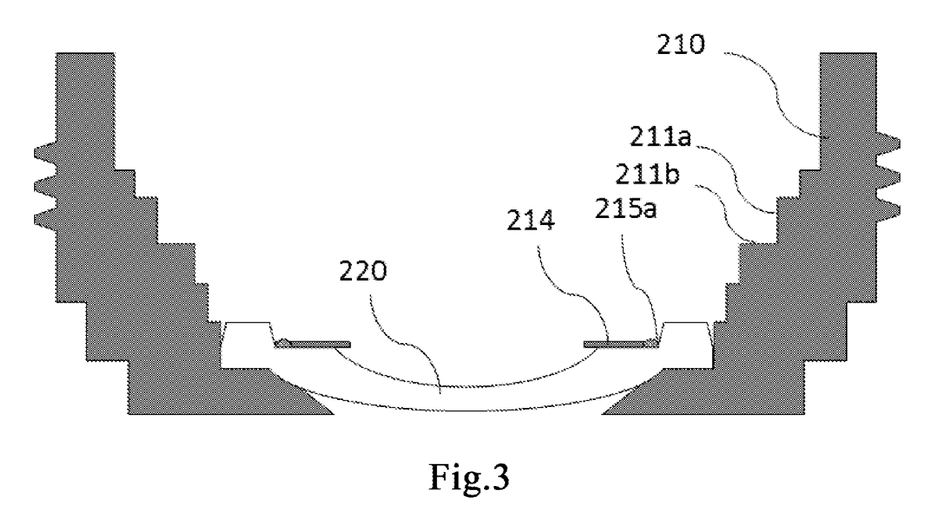
FIG. 3 shows a schematic diagram of providing a spacer ring 214 on a bottom surface of the lens.
Figure 4:
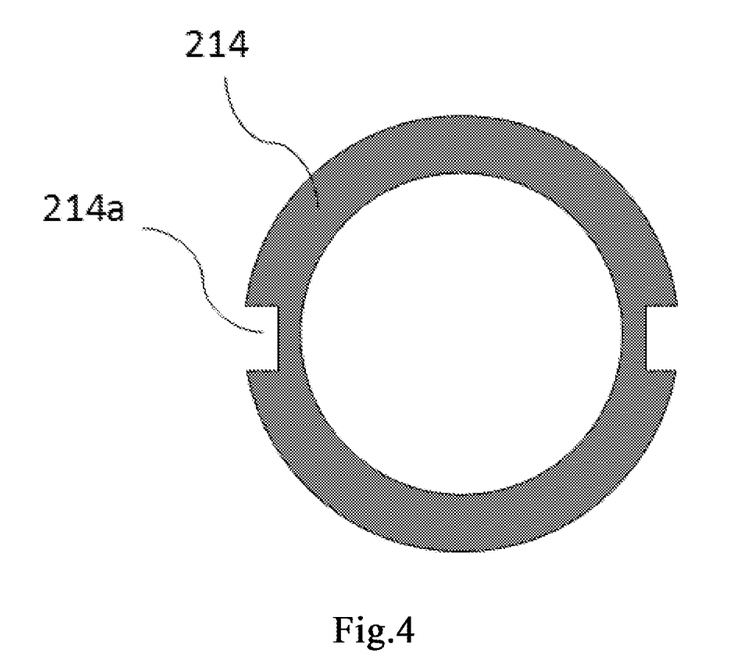
FIG. 4 shows a schematic bottom view of the spacer ring 214 provided.
Figure 5:
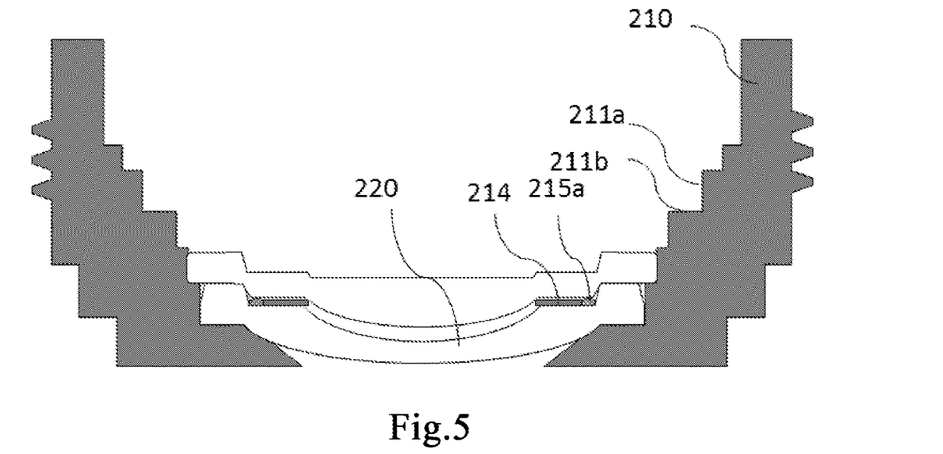
FIG. 5 shows a schematic diagram of embedding the second lens into the lens barrel.

Further, in an embodiment of the present application, the lens group assembly includes two adjacent adhesive reinforcement lenses, and a spacer ring 214 is provided between the two adjacent adhesive reinforcement lenses. The spacer ring 214 may have a notch and the notch accommodates the glue 215*a*. Still referring to FIG. 2, the first lens is embedded in the first step of the lens barrel. An outer surface of the structure zone of the lens leans leans against the step side wall 211*a* of the first step, and a top surface of the structure zone (when the plurality of lenses are assembled into a lens group, the lens barrel and the lens are usually inverted, so the top surface of the structure zone in FIG. 2 is at the bottom of the lens). In this embodiment, a bottom surface of the structural zone of the lens may have a protrusion (in FIG. 2, the lens is inverted, so the protrusion is convex upward). Furthermore, FIG. 3 shows a schematic diagram of a spacer ring 214 provided on the bottom surface of the lens. FIG. 4 shows a schematic bottom view of the spacer ring 214 provided. Referring to FIG. 4, the spacer ring 214 has a notch, and the notch may be a concave 214*a* that is recessed from outside to inside. When the spacer ring 214 is arranged on the bottom surface of the lens, a gap can be formed between the groove and the structure zone of the first lens, and the gap can accommodate the adhesive material 215. In other embodiments, the gap accommodating the adhesive material 215 may also be formed between the groove and the lens barrel (for example, the step side wall 211*a* of the lens barrel). The adhesive material 215 is arranged in the gap. In this embodiment, the adhesive material 215 may be a glue 215*a*. Further, FIG. 5 shows a schematic diagram of embedding the second lens into the lens barrel. Wherein, the second lens and the first lens can lean each other through the spacer ring 214 to assemble a composite body with stable optical performance. Referring to FIG. 5, the adhesive material is located between the two lenses to reinforce the structural strength of the composite body of the two lenses. The two lenses in FIG. 5 are adhesive reinforcement lenses. In a lens group assembly, there can be multiple groups of adjacent adhesive reinforcement lenses.

Further, in one embodiment, a SOMA sheet can be fixed by being fitted between the lenses, or it can be placed inside without force. In particular, the SOMA sheet is designed to have a notched shape. The notch of the SOMA sheet can be used as a mark for machine vision recognition (machine vision here is used to identify a starting point of gluing), and it can also be a space for the glue 215*a*.

Figure 6:
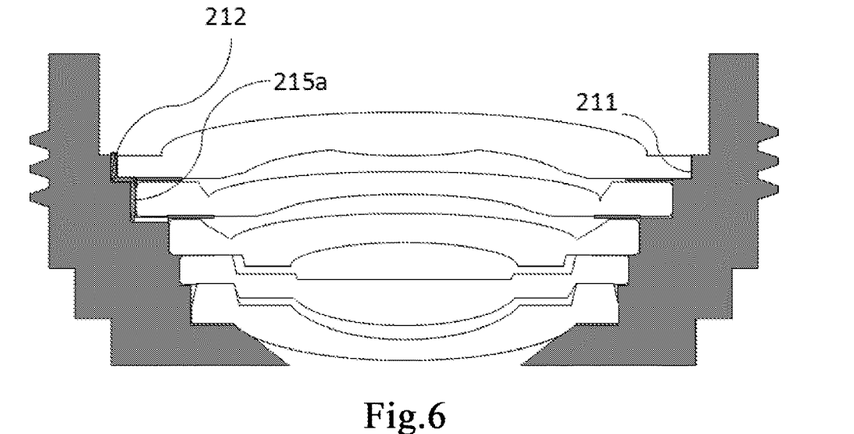
FIG. 6 shows a schematic diagram of a lens barrel with a flow guide channel on an inner side thereof and embedding a lens in the lens barrel.
Figure 7:
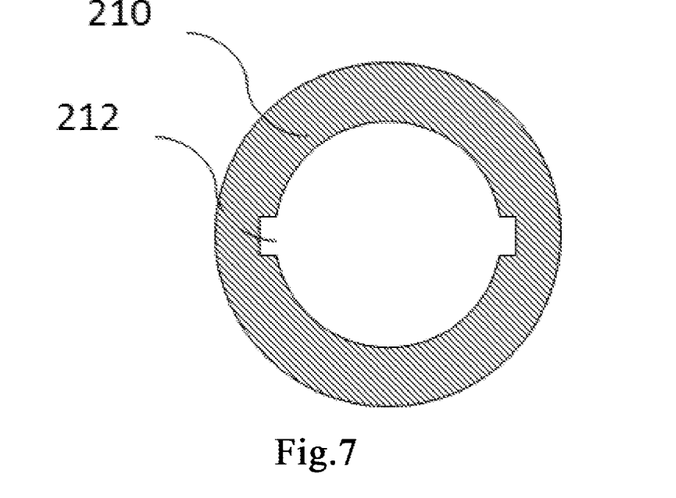
FIG. 7 shows a schematic bottom view of the flow guide channel located in the lens barrel in an embodiment of the present application.

Further, in an embodiment of the present application, the inner surface of the lens barrel has a flow guide channel. FIG. 6 shows a schematic diagram of a lens barrel with a flow guide channel on the inner surface thereof and a lens embedded in the lens barrel. Referring to FIG. 6, the flow guide channel communicates with at least two adjacent steps of the multi-step steps 211 of the lens barrel, so as to be suitable for the glue 215*a* to flow between the at least two adjacent steps. The flow guide channel is filled with the glue 215*a*. FIG. 7 shows a schematic bottom view of the flow guide channel located in the lens barrel in an embodiment of the present application. Referring to FIG. 7, the flow guide channel may be a flow guide groove 212, and the flow guide groove 212 is a recessed structure located on the inner side of the lens barrel. A gap between the flow guide groove 212 and the outer surface of the lens can be filled with the glue 215*a* to form a structural reinforcement for the assembled lens group. In this embodiment, the adhesive material 215 may be UV glue/UV thermosetting glue, thermosetting glue, moisture curing glue, anaerobic glue or solvent evaporative curing glue. An area where the glue is laid is an edge area of the lens, which is far from the optical zone of the lens. In this embodiment, the adhesive material 215 has a relatively small viscosity, for example, the viscosity is 500 or less. Viscosity represents the degree of dilution of the glue 215*a*. The lower the viscosity is, the better the fluidity is. The thixotropic coefficient of the glue 215*a* is within 1.2. The thixotropy coefficient represents the thixotropy, which refers to the characteristic that the shear stress of the glue 215*a* (or called glue solution) decreases over time under the action of a certain shear rate. The specific performance of the glue with a thixotropic coefficient within 1.2 in the adhesive process is: under agitation, the viscosity of the glue solution drops rapidly, which is convenient for painting; when it is stopped, the viscosity of the glue solution increases immediately and will not flow randomly, and the viscosity is relatively thin when used, and easy to scrape.

In one embodiment, the adhesive material 215 may be underfill glue. The underfill glue is glue 215a suitable for a underfill process, and its thixotropic coefficient is within 1.2.

Further, in one embodiment, a recessed depth of the flow guide groove 212 inside the lens barrel is greater than 20 μm, and a width of the flow guide groove 212 is greater than 20 μm (the specific design size of the flow guide groove can be determined according to the lens size and the properties of the adhesive material). The glue 215a flows through the flow guide channel to bond adjacent lenses, and bond the lenses and the lens barrel, thereby enhancing the connection strength of the assembled lens group.

Figure 8:
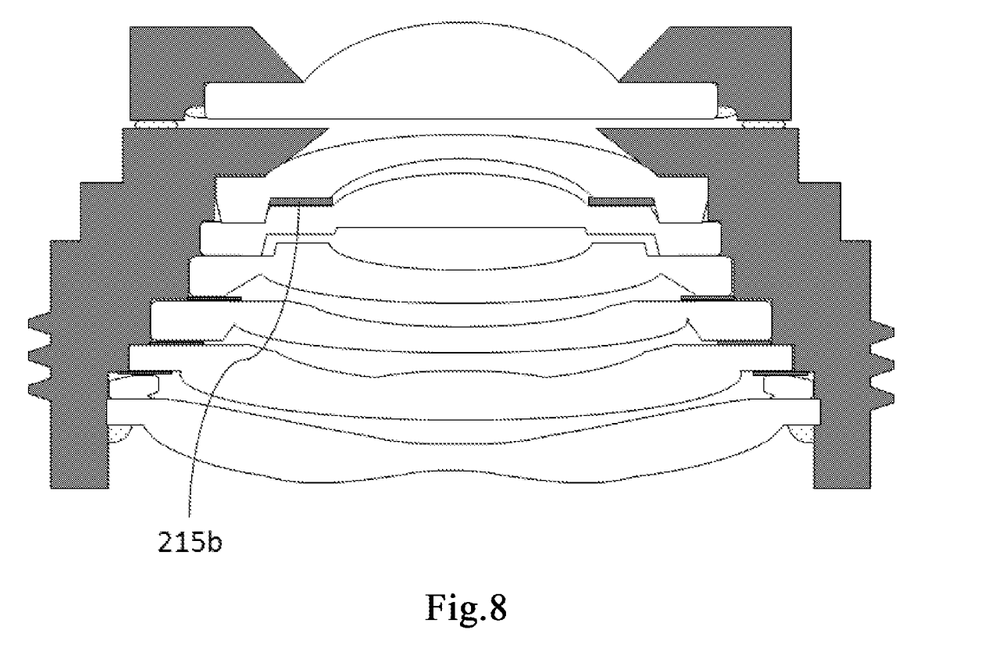
FIG. 8 shows a schematic cross-sectional view of an optical lens according to another embodiment of the present application.

FIG. 8 shows a schematic cross-sectional view of an optical lens according to another embodiment of the present application. In this embodiment, the spacer ring 214 between the lenses is replaced by a glue film 215b (for example, an EVA glue film). In other words, the glue film 215b can be made into the shape of the spacer ring 214 to replace the function of the spacer ring 214. For example, the glue film 215b is made opaque (for example, set to be black), so that the glue film 215b has the function of blocking light, thereby forming a diaphragm between the lenses to prevent stray light from interfering with the imaging result. On the other hand, since the glue film 215b has adhesiveness, the glue film 215b functions to bond the lenses after being pressed by the adjacent lenses during the lens assembling, thereby reinforcing the structural strength of the lens assembling.

Figure 9:
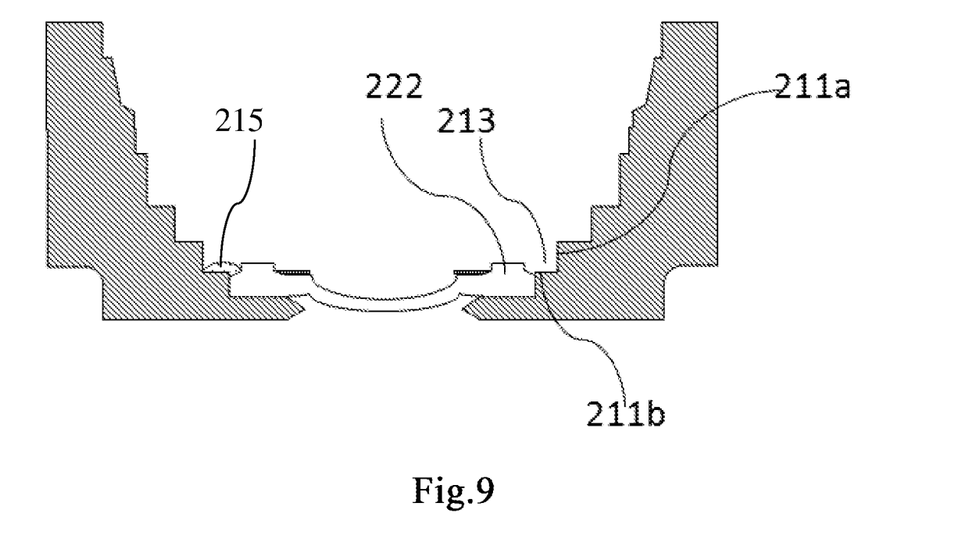
FIG. 9 shows another example of adhering reinforcement between embedded reinforcement lens and a lens barrel.
Figure 10:
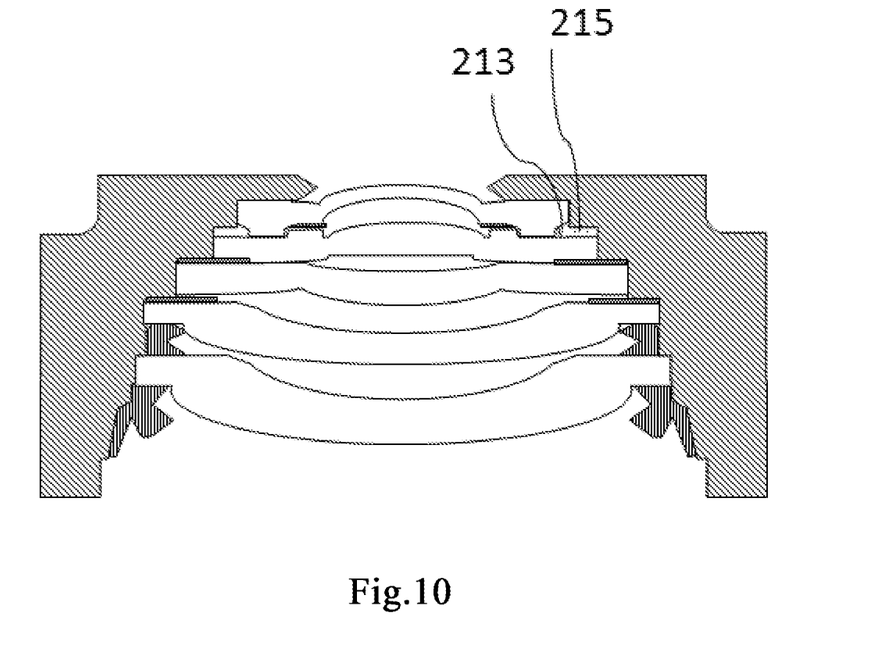
FIG. 10 shows a complete lens group assembly with the glue containing groove 213 shown in FIG. 9.

Further, in an embodiment of the present application, the plurality of lenses assembled into the lens group include embedded reinforcement lenses, and the adhesive material 215 is provided between the embedded reinforcement lenses and the lens barrel. Referring to FIG. 2, in an embodiment, an outer surface of the embedded reinforcement lens may include an inclined surface 221 (or called an inclined segment), and the inclined surface 221 can form a wedge-shaped gap with the inner surface of the lens barrel (for example, the step side wall 211a), the glue 215a can be arranged in the wedge-shaped gap, so as to reinforce the structural strength of the lens group. FIG. 9 shows another embodiment of adhesive reinforcement between the embedded reinforcement lens and the lens barrel. Referring to FIG. 9, in another embodiment, a structure zone of the embedded reinforcement lens may include a protrusion, and an outer surface of the protrusion and the inner surface of the lens barrel may form a glue containing groove 213, specifically, in FIG. 9, the outer surface of the protrusion, the step surface 211b and the step side wall 211a of the lens barrel together form the glue containing groove 213. Glue is arranged in the glue containing groove 213. Further, FIG. 10 shows a complete lens group assembly having the glue containing groove 213 shown in FIG. 9. The lens group assembly can be used as the second lens component 200. For example, the lens group assembly shown in FIG. 10 can replace the second lens component 200 in the embodiment of FIG. 1 to form another optical lens 1000 assembled based on the active calibration process.

Further, in the above-mentioned embodiment, the adhesive material 215 can be arranged in an annular shape (for example, the flow guide groove 212 or the glue containing groove 213 can be annular shaped in a plan view), or may be distributed at several points in an annular area (for example, a flow guide groove 212 or a glue containing groove 213 can be provided in each of the four directions inside the lens barrel.

Figure 11:
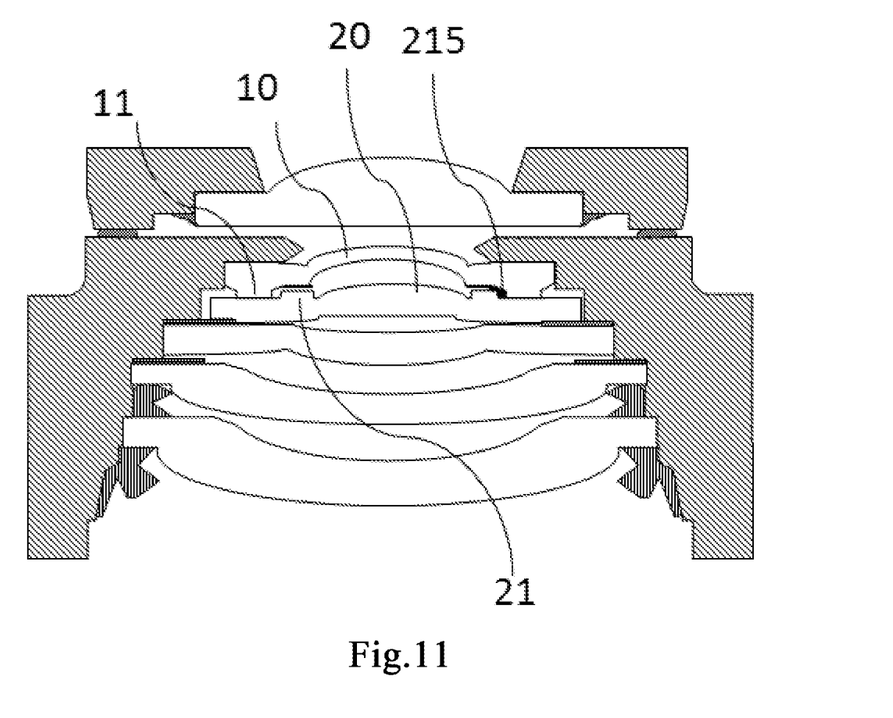
FIG. 11 shows a schematic diagram of an optical lens with a first fitting lens 10 and a second fitting lens 20 adjacent to each other.

Further, in an embodiment of the present application, the plurality of lenses assembled into the lens group includes a first fitting lens 10 and a second fitting lens 20 adjacent to each other. FIG. 11 shows a schematic diagram of an optical lens having the first fitting lens 10 and the second fitting lens 20 adjacent to each other. Referring to FIG. 11, a structure zone of the first fitting lens 10 has a first fitting protrusion 11, and a structure zone of the second fitting lens 20 has a second fitting protrusion 21, The first fitting protrusion 11 and the second fitting protrusion 21 are staggered from each other, and the adhesive material 215 is arranged on a fitting gap formed between an inner surface of the first fitting protrusion 11 and an outer surfaces of the second fitting protrusion 21.

Further, in an embodiment of the present application, the adhesive material is bonded between the structural zones of the three lenses at the front end of the lens group to reinforce the structural strength of the assembled lens group. In another embodiment, any one or more of the three lenses at the front end can be bonded with the lens barrel to reinforce the structural strength of the lens group. Further, for the above three lenses at the front end, the adhesive materials can be arranged between the lenses and between the lenses and the lens barrel to enhance the reinforcement effect. When the number of lenses in the lens group is large, for example, four or more than four, since the optical sensitivity of the first three lenses is relatively high, the assembling structure strength of the first three lenses can be reinforced, which can better improve the reliability of the active calibration process and optical lens imaging. Herein, the front end refers to the end of the lens group or optical lens close to the object.

Further, according to an embodiment of the present application, there also provides a lens group assembling method, which includes:

1) embedding a plurality of lenses into a lens barrel with multi-level steps 211 at an inner side thereof to assemble a lens group; and 2) during the execution of step 1) or after the embedding step is completed, adding an adhesive material 215 between at least two lenses of the plurality of lenses and/or at least one lenses of the plurality of lenses and the lens barrels to reinforce the structural strength of the assembled lens group.

Wherein, the process of embedding the plurality of lenses into the lens barrel in step 1) includes: inverting the lens barrel, and embedding the first lens into the first step inside the lens barrel, and then embedding the second lens into the second step inside the lens barrel, and then embedding the next lens into the next step, and repeating until all the lenses are inserted into the lens barrel. Structural zones of two adjacent lenses can directly lean each other, or they can bear each other through a spacer ring 214 (e.g., a SOMA sheet). When the structural zones of two adjacent lenses are leaned together by the spacer ring 214, the embedding process of the two lenses is added with the step of arranging the spacer ring 214. For example, the former lens is first embedded in the lens barrel, then the spacer ring 214 is arranged on the surface of the structure zone of the former lens, and then the next lens is inserted in the lens barrel.

Further, in some embodiments of the present application, the step 2) includes any one or more of sub-steps a), b), and c), and the sub-steps a), b), and c) are as follows.

a) for two adjacent lenses, in the process of embedding the two lenses into the lens barrel, arranging the adhesive material 215 between the two lenses. That is, for two adjacent lenses, after the former lens is embedded, the adhesive material 215 is arranged on the surface of the structure zone of the lens (referring to the former lens) (in the embedding step, the lens barrel and the lens are usually inverted, so the surface here is usually a bottom surface). Then the latter lens is embedded.

In an embodiment, the adhesive material 215 may be glue 215a. Preferably, in order to prevent the glue 215a from polluting the optical zone, the glue 215a may be arranged in a groove formed between the spacer ring 214 and the lens (referring to the former lens). The spacer ring 214 may have a concave 214a as shown in FIG. 4, and a groove is formed between the concave 214a and the lens. The arrangement method of the glue 215a may include: after embedding the former lens, arranging a spacer ring on the surface of the structure zone of the former lens, wherein the spacer ring has a concave 214a, and the concave 214a is recessed from outside to inside along the direction perpendicular to the optical axis, an area of the surface of the former lens corresponding to the position of the concave 214a is exposed; then arranging the glue 215a in the area corresponding to the position of the concave 214a, and finally embedding the latter lens.

In another embodiment, the adhesive material may be a glue film 215b. The glue film 215b can be made into the shape of the spacer ring 214 to replace the function of the spacer ring 214. For example, the glue film 215b is made opaque (for example, set to be black), so that the glue film 215b has a function of blocking light, thereby forming a diaphragm between the lenses to prevent stray light from interfering with the imaging result. On the other hand, since the glue film 215b has adhesiveness, the glue film 215b acts to bond the lenses after being pressed by the adjacent lenses during the lens assembling, thereby reinforcing the structural strength of the lens assembling.

In another embodiment, the plurality of lenses assembled into the lens group include the adjacent first fitting lens 10 and second fitting lens 20 as shown in FIG. 11. The structure zone of the first fitting lens 10 has a first fitting protrusion 11, and the structure zone of the second fitting lens 20 has a second fitting protrusion 21. After the first fitting lens 10 (i.e., the former lens) is embeded, glue 215a is arranged on the surface of the structure zone of the first fitting lens 10 close to the inner surface of the first fitting protrusion 11. Then the second fitting lens 20 is embeded into the lens barrel, and the first fitting protrusion 11 and the second fitting protrusion 21 are staggered with each other, so that the glue 215a is located on a fitting gap formed between the inner surface of the first fitting protrusion 11 and the outer surface of the second fitting protrusion 21.

b) for two adjacent lenses, after embeding the former lens, arranging the glue 215a between the lens (the former lens) and the lens barrel, and then embedding the latter lens. For ease of description, sometimes the lens adhered with the lens barrel through the glue 215a is referred to as an embedded reinforcement lens.

As shown in FIG. 2, in an example, the outer surface of the embedded reinforcement lens may include the inclined surface (or called the inclined segment), and the inclined surface may form the wedge-shaped gap with the inner surface of the lens barrel (for example, the step side wall 211a), the glue 215a can be arranged in the wedge-shaped gap, so as to reinforce the structural strength of the lens group. FIG. 9 shows another embodiment of the embedded reinforcement lens and the lens barrel for bonding and reinforcing. Referring to FIG. 9, in another embodiment, a structure zone of the embedded reinforcement lens may include a protrusion, and an outer surface of the protrusion and the inner surface of the lens barrel may form a glue containing groove 213, specifically, in FIG. 9, the outer surface of the protrusion forms the glue containing groove 213 with the step surface 211b and the step side wall 211a of the lens barrel together. The glue 215a is arranged in the glue containing groove 213.

c) after two adjacent (or more) lenses are embedded in the lens barrel, arranging the glue 215a through a flow guide channel provided on the inner side surface of the lens barrel, so that the glue 215a enters a gap between the structural zones of two (or more) adjacent lenses.

Referring to FIG. 6, the flow guide channel communicates with at least two adjacent steps of the multi-step steps 211 of the lens barrel, so as to be suitable for the glue 215a to flow between the at least two adjacent steps. Referring to FIG. 7, the flow guide channel may be a flow guide groove 212, and the flow guide groove 212 is a recessed structure located on the inner side of the lens barrel. The gap between the flow guide groove 212 and the outer surface of the lens can be filled with glue 215a to form a structural reinforcement for the assembled lens group. In this embodiment, the adhesive material 215 may be UV glue/UV thermosetting glue, thermosetting glue, moisture curing glue, anaerobic glue or solvent evaporative curing glue. An area where the glue 215a is arranged is an edge area of the lens, which is far away from the optical zone of the lens. In this embodiment, the adhesive material 215 has a relatively small viscosity, for example, the viscosity is 500 or less. Viscosity represents the degree of dilution of glue 215a. The lower the viscosity is, the better the fluidity is. The thixotropic coefficient of the glue 215a is within 1.2. The thixotropy coefficient represents the thixotropy, which refers to the characteristic that the shear stress of the glue 215a (or called glue solution) decreases over time under the action of a certain shear rate. The glue 215a with a thixotropic coefficient of less than 1.2 has specific performance in the adhesion process: under agitation, the viscosity of the glue solution drops rapidly, which is convenient for painting; when the agitation is stopped, the viscosity of the glue solution increases immediately and will not flow randomly, and the viscosity is relatively thin to use, and it is easy to scrape. In this embodiment, after the plurality of lenses are embedded in the lens barrel, the flow guide channel is used to arrange the glue 215a to the position between the lenses.

It should be noted that the above sub-steps a), b), and c) correspond to several different methods of using the adhesive material to reinforce the lens group. In the assembling process of the lens group, one of these reinforcement methods can be used alone, multiple of the above reinforcement methods can also be used in combination.

The following will further introduce the active calibration process used in the optical lens or camera module assembly method.

Figure 12A:
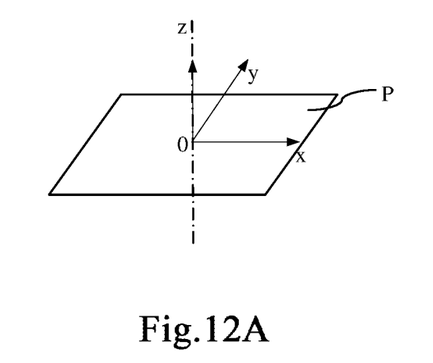
FIG. 12A shows a relative position adjustment manner in an active calibration in an embodiment of the present application.

The active calibration described in this application can adjust a relative position of the first lens component 100 and the second lens component 200 in multiple degrees of freedom. FIG. 12A shows a relative position adjustment manner in the active calibration in an embodiment of the present application. In this adjustment manner, the first lens component 100 (or the first lens 101) can move relative to the second lens component 200 along x, y, and z directions (that is, The adjustment has three degrees of freedom for the relative position in this embodiment). The z direction is the direction along the optical axis, and the x and y directions are the directions perpendicular to the optical axis. The x and y directions are both in an adjustment plane P, and in the adjustment plane P, the translation can be decomposed into two components in the x and y directions.

Figure 12B:
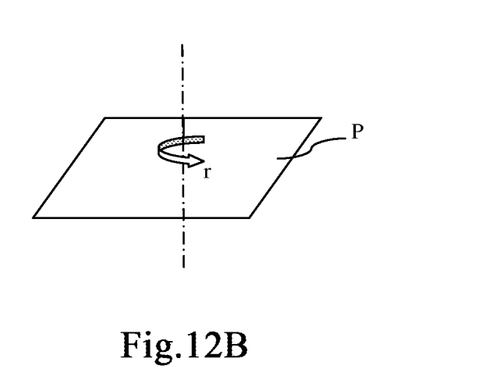
FIG. 12B shows a relative position adjustment manner in the active calibration in an embodiment of the present application.

FIG. 12B shows a rotation adjustment in the active calibration of another embodiment of the present application. In this embodiment, in addition to the three degrees of freedom of FIG. 12A, the relative position adjustment also adds a degree of freedom of rotation, that is, adjustment in r direction. In this embodiment, the adjustment in the r-direction is a rotation in the adjustment plane P, that is, a rotation around an axis perpendicular to the adjustment plane P.

Figure 12C:
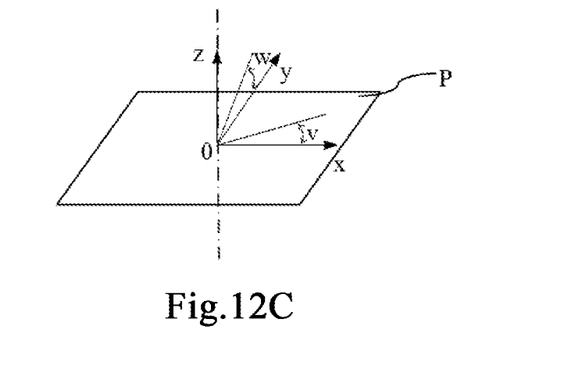
FIG. 12C shows a relative position adjustment manner in the active calibration according to another embodiment of the present application, which adds adjustment in v and w directions.

Further, FIG. 12C shows a relative position adjustment manner in the active calibration according to another embodiment of the present application with addition of v and w direction adjustments. Wherein, the v direction represents a rotation angle of a xoz plane, the w direction represents a rotation angle of a yoz plane, the rotation angles of the v direction and the w direction can be combined into a vector angle, and this vector angle represents a total tilt state. In other words, by adjusting the v and w directions, a tilt posture of the first lens component 100 relative to the second lens component 200 can be adjusted (that is, the tilt of the optical axis of the first lens component 100 with respect to the optical axis of the second lens component 200).

The adjustment of the six degrees of freedom of x, y, z, r, v, and w described above may all affect the imaging quality of the optical system (for example, affect the size of the resolution). In other embodiments of the present application, the relative position adjustment manner may be to adjust only any one of the above six degrees of freedom, or a combination of any two or more of them.

Further, in one embodiment, in the active calibration step, the adjustment of the relative position of the first lens component and the second lens component includes translation on the adjustment plane, that is, movement in the x and y directions.

Further, in one embodiment, in the active calibration step, The adjustment of the relative positions of the first lens component 100 and the second lens component 200 further includes: according to a measured resolution of the optical system, adjusting and determining an angle between the axis of the first lens component 100 and the axis of the second lens component 200, that is, the adjustment in the w and v directions. In the assembled optical lens or camera module, there is a non-zero included angle between the axis of the first lens component 100 and the axis of the second lens component 200.

Further, in an embodiment, in the active calibration step, adjusting the relative position of the first lens component 100 and the second lens component 200 further includes: moving the first lens component 100 in a direction perpendicular to the adjustment plane (i.e., adjustment in the z direction), according to the measured resolution of the optical system, determining the relative position between the first lens component 100 and the second lens component 200 in the direction perpendicular to the adjustment plane.

Further, in an embodiment, the first lens component 100 may not have the first lens barrel 110. For example, the first lens component 100 may be constituted of a single first lens 120. Before the active calibration, a corresponding predetermined positioning is first performed, so that there is a gap between the bottom surface of the first lens 120 and the top surface of the second lens component 200; then the active calibration is performed, and then the adhesive material is arranged on the gap and solidified. In this embodiment, the first lens 120 may be formed by a plurality of sub-lenses that are embedded with each other to form a whole. In this embodiment, a side surface and a top surface of the non-optical surface of the first lens 120 that are not used for imaging may form a light shielding layer. The light shielding layer may be formed by screen printing a light shielding material on the side and top surface of the first lens 120.

In one embodiment, in the active calibration step, the second lens component 200 can be fixed, the first lens component 100 can be clamped by a clamp, and the first lens component 100 can be moved under drive of a six-axis motion mechanism connected to the clamp, thereby the relative movement between the first lens component 100 and the second lens component 200 in the above six degrees of freedom is realized. Wherein, the clamp can be leaned against or partially leaned against the side surface of the first lens component 100, thereby clamping the first lens component 100 and performing position adjustment with multiple degrees of freedom.

The above description is only a preferred embodiment of the application and an explanation of the applied technical principles. Those skilled in the art should understand that the scope of the invention involved in this application is not limited to the technical solution formed by the specific combination of the above technical features, and should also cover other technical solutions formed by any combination of the above technical features or their equivalent features without departing from the stated concept of the invention. For example, the above-mentioned features and the technical features disclosed in this application (but not limited to) with similar functions are mutually replaced to form a technical solution.

The invention claimed is:

1. An optical lens, characterized by comprising:
a first lens component including at least one first lens;
a second lens component including a second lens barrel and at least one second lens mounted in the second lens barrel, wherein the at least one second lens and the at least one first lens constitute an imageable optical system together; and
an active calibration adhesive glue, which is located between the first lens component and the second lens component, and is adapted to support the first lens component and the second lens component so that a relative position of the first lens component and the second lens component is maintained at a relative position determined by an active calibration;
wherein the second lens component is a lens group assembly, characterized by comprising:
the second lens barrel being a lens barrel; and
the at least one second lens being a plurality of lenses, wherein the plurality of lenses are embedded in the lens barrel to assemble a lens group, and there is an adhesive material between at least two lenses of the plurality of lenses and/or between at least one lens of the plurality of lenses and the lens barrels to reinforce the structural strength of the assembled lens group.

2. The optical lens according to claim 1, wherein the plurality of lenses have three lenses at the front end, and the adhesive material is between at least two lenses of the three lenses at the front end and/or between at least one lens of the three lenses at the front end and the lens barrel.

3. The optical lens according to claim 2, wherein the lens has an optical zone and a structural zone surrounding the optical zone, and the plurality of lenses includes two adjacent adhesive reinforcement lenses, and the adhesive material is between the structural zones of the two adjacent adhesive reinforcement lenses.

4. The optical lens according to claim 2, wherein the lens has an optical zone and a structural zone surrounding the optical zone, and the plurality of lenses include adjacent first fitting lenses and second fitting lens, and the structure zone of the first fitting lens has a first fitting protrusion, and the structure zone of the second fitting lens has a second fitting protrusion, and the first fitting protrusion and the second fitting protrusion are staggered with each other, and the adhesive material is arranged in a fitting gap formed between an inner surface of the first fitting protrusion and an outer surface of the second fitting protrusion.

5. The optical lens to claim 2, wherein the adhesive material includes glue and/or glue film.

6. The optical lens to claim 5, wherein in case that the adhesive material is glue, the glue is glue with a thixotropic coefficient within 1.2 and a viscosity below 500.

7. The optical lens to claim 5, wherein when in case that the adhesive material is glue, the plurality of lenses include two adjacent adhesive reinforcement lenses, and a spacer ring is arranged between the two adjacent adhesive reinforcement lenses, and the spacer ring has a notch and the notch contains the glue.

8. The optical lens to claim 5, wherein in case that the adhesive material is a glue film, the plurality of lenses include two adjacent adhesive reinforcement lenses, and the two adjacent adhesive reinforcement lenses are adhesived by the glue film.

9. The optical lens to claim 1, wherein the plurality of lenses include an embedded reinforcement lenses, and the adhesive material is provided between the embedded reinforcement lens and the lens barrel.

10. The optical lens to claim 1, wherein an inner side of the lens barrel has multi-level steps, and the plurality of lenses are sequentially embedded in the multi-level steps.

11. The optical lens to claim 10, wherein each step in the multi-level steps includes a step side wall and a step surface, wherein the step side wall is parallel to the axis of the lens barrel, and the step surface is perpendicular to the axis of the lens barrel.

12. The lens to claim 11, wherein the adhesive material is glue, and the inner side of the lens barrel is provided with a flow guide channel, and the flow guide channel communicates with at least two adjacent steps of the multi-level steps, so as to be suitable for the flow of the glue between the at least two adjacent steps, and the flow guide channel is filled with the glue.

13. The optical lens to claim 12, wherein the flow guide channel is a flow guide groove, and at least one step corresponding to the flow guide groove is arranged with the embedded reinforcement lens, and a gap between an outer surface of the embedded reinforcement lens and the flow guide groove is filled with the adhesive material.

14. The optical lens to claim 1, wherein the adhesive material is arranged in a ring shape, or the adhesive material is distributed at a plurality of points in the ring shape.

15. The optical lens to claim 1, wherein the adhesive material is an UV glue, an UV thermosetting glue, a thermosetting glue, a moisture curing glue, an anaerobic glue or a solvent evaporative curing glue.

16. The optical lens of claim 1, wherein the first lens component further includes a first lens barrel, and the at least one first lens is mounted in the first lens barrel.

17. The optical lens of claim 16, wherein the first lens component is the lens group assembly, and the first lens barrel is the lens barrel of the lens group assembly, and the at least one first lens is the plurality of lenses of the lens group assembly.

18. The optical lens of claim 1, wherein a non-zero included angle is between the axis of the first lens component and the axis of the second lens component.

19. A lens group assembling method, characterized by comprising:
   1) Embedding a plurality of lenses into a lens barrel with multi-level steps at an inner side thereof to assemble a lens group in an optical lens; and
   2) During the execution of step 1) or after the completion of step 1), adding an adhesive material between at least two lenses of the plurality of lenses and/or between at least one lens of the plurality of lenses and the lens barrel to reinforce the structural strength of the assembled lens group;
   wherein the optical lens is characterized by comprising:
   a first lens component including at least one first lens;
   a second lens component including a second lens barrel and at least one second lens mounted in the second lens barrel, wherein the at least one second lens and the at least one first lens constitute an imageable optical system together; and
   an active calibration adhesive glue, which is located between the first lens component and the second lens component, and is adapted to support the first lens component and the second lens component so that a relative position of the first lens component and the second lens component is maintained at a relative position determined by an active calibration;
   wherein the second lens component is the lens group assembled.

* * * * *